Oct. 6, 1942.  A. B. NEWTON  2,298,150
EXPANSION VALVE
Filed Feb. 26, 1938  5 Sheets-Sheet 1

Inventor
Alwin B. Newton
George H Fisher
Attorney

Oct. 6, 1942.　　　A. B. NEWTON　　　2,298,150
EXPANSION VALVE
Filed Feb. 26, 1938　　　5 Sheets-Sheet 2

Inventor
Alwin B. Newton
George H Fisher
Attorney

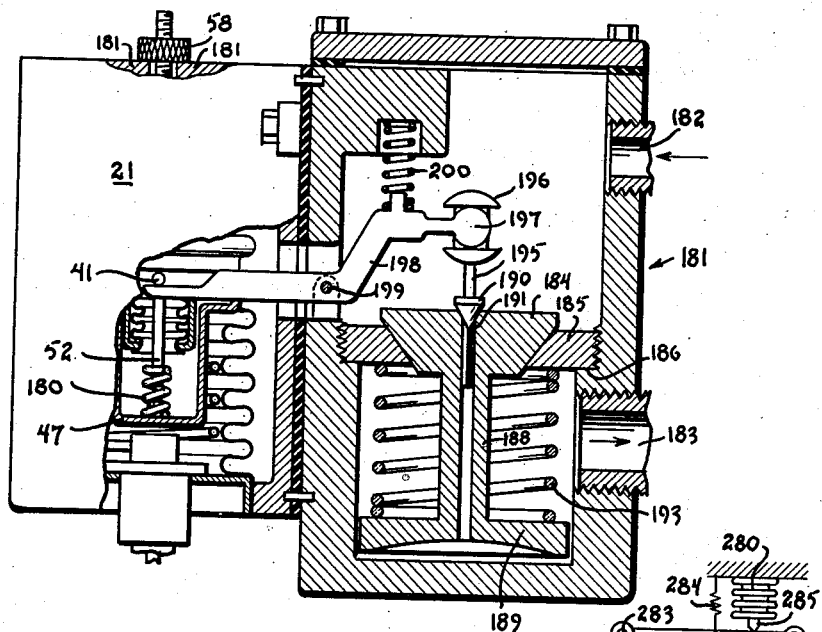
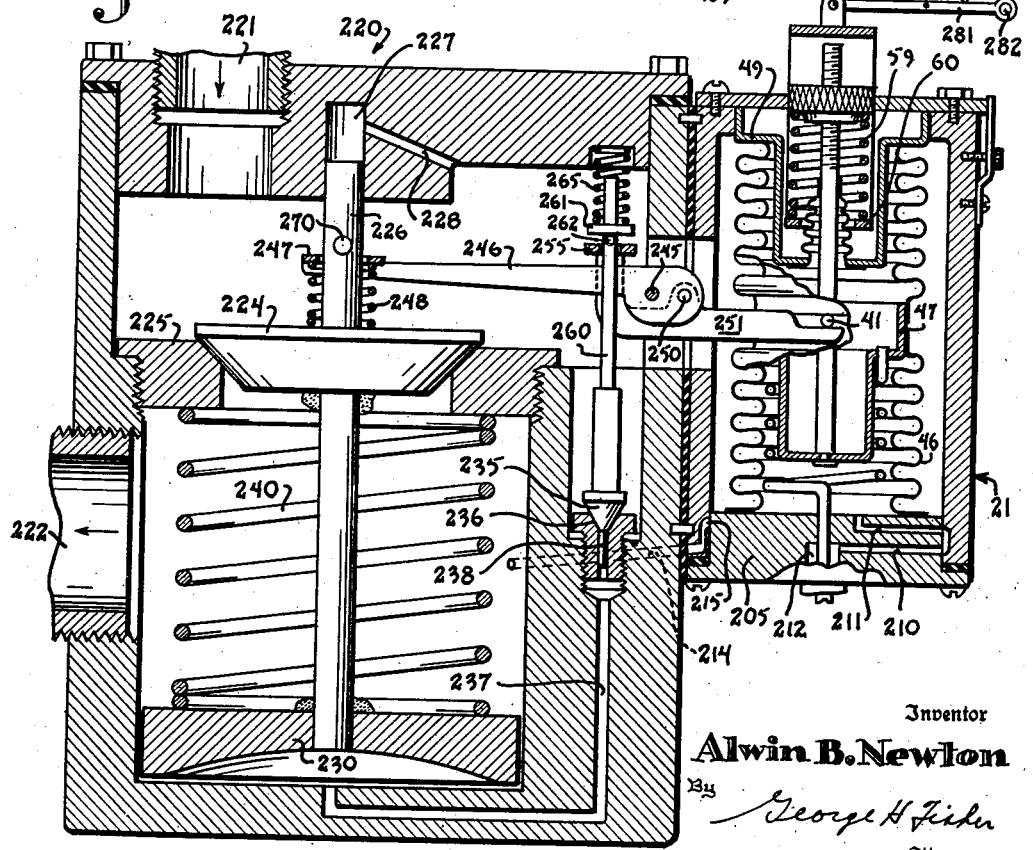

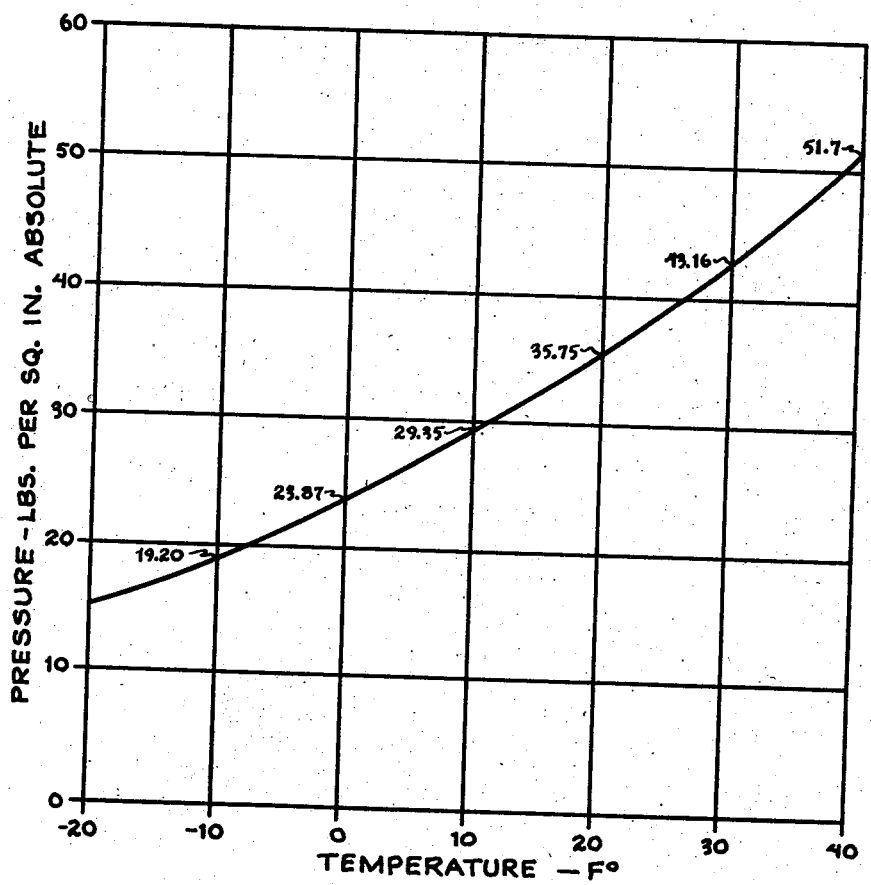

Patented Oct. 6, 1942

2,298,150

UNITED STATES PATENT OFFICE 2,298,150

EXPANSION VALVE

Alwin B. Newton, Minneapolis, Minn., assignor to Minneapolis-Honeywell Regulator Company, Minneapolis, Minn., a corporation of Delaware Application February 26, 1938, Serial No. 192,818

27 Claims. (Cl. 62—127)

This invention relates to expansion valves for use in refrigeration systems and more particularly to expansion valves of the automatic type controlled by superheat at the evaporator outlet.

Thermostatic expansion valves may be divided into two general classifications, namely, those whose operating elements are in the form of bellows and those employing diaphragms as the operating elements. In the bellows type of expansion valve, difficulty has been experienced in the past due to the fact the bellows is exposed to refrigerant on one side and to humid atmospheres on the other side, thus causing rapid deterioration of the bellows, whereas if the bellows are maintained entirely out of contact with the atmosphere, the main cause of deterioration of the bellows is removed. This I have been able to accomplish by a novel arrangement of the bellows, thereby retaining the known advantages of the bellows type of thermostatic expansion valve while eliminating the disadvantage thereof. One of the objects of my invention is therefore the provision of a thermostatic expansion valve of the bellows actuated type wherein the bellows are exposed on both sides to refrigerant thereby reducing the danger of rupture of the bellows.

Another object of my invention is the arrangement of the bellows so that in case any one of the bellows should rupture, no refrigerant would be lost therethrough.

A further object of my invention is the provision of means to eliminate hunting of the valve.

Another object is the provision of a power unit for an expansion valve which may readily be applied directly to the expansion valve or to a pilot valve for causing the operation of a large size expansion valve.

Another object of the invention is the provision of a sealing bellows in addition to the operating bellows for the valve for further reducing the danger of leakage of the refrigerant, together with means for compensating for the spring rate of the bellows.

A further object of my invention is the novel arrangement of a thermostatic expansion valve operated in accordance with the superheat at the evaporator outlet wherein no sealed operating bulb is employed.

A further object of the invention is the provision of a novel bellows arrangement for operating a thermostatic expansion valve so as to maintain a substantially constant degree of superheat for varying pressures at the evaporator outlet.

A further object of the invention is the provision of an expansion valve which may be interchangeably used with refrigeration systems using different kinds of refrigerants.

Another object is the provision of means for connecting the valve operating means to the interior of the evaporator outlet at a single point.

Other objects will become apparent upon a study of the specification, claims, and appended drawings, in which like reference characters represent like parts in the various views and in which:

Figure 7 is a view in partial cross section of another form of expansion valve embodying my invention;

Figure 8 is a cross sectional view of a still further modification of the expansion valve embodying my invention;

Figure 11 is a pressure temperature curve of the refrigerant known as Freon or F-12.

Figure 1:
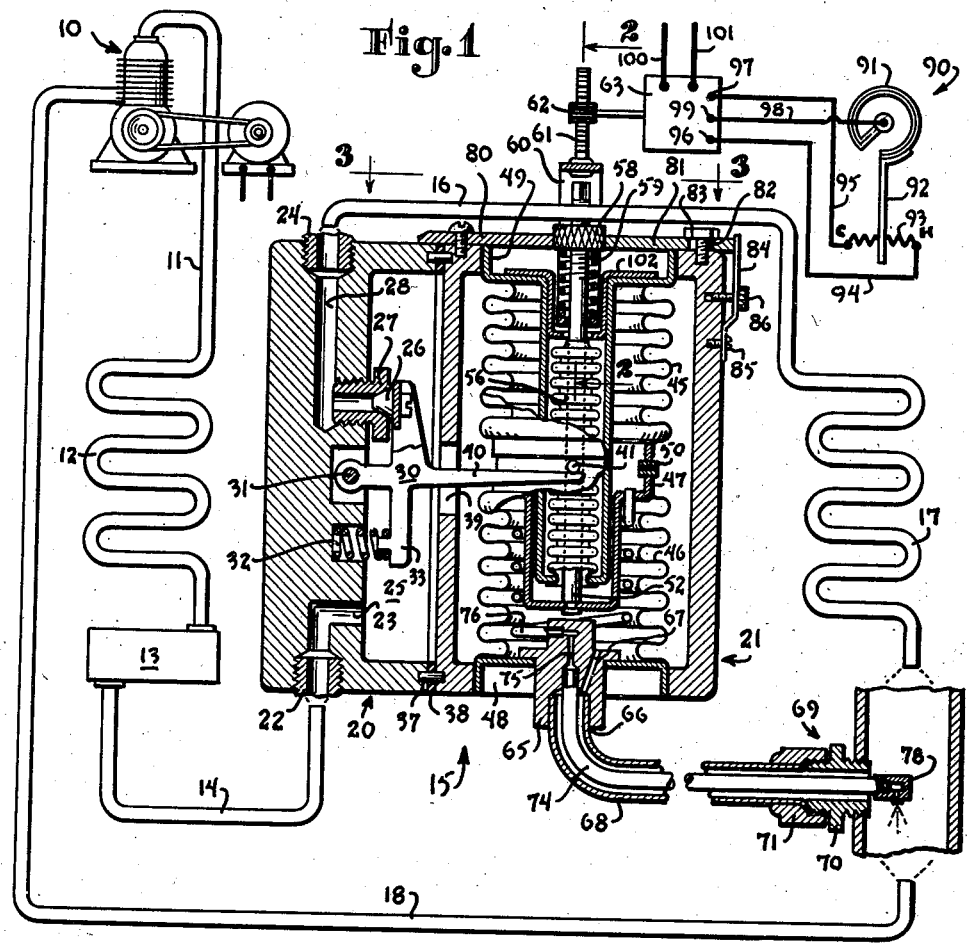
Figure 1 is a view showing a refrigeration system in which an expansion valve embodying one form of my invention is illustrated partly in cross section.
Figures 2, 3:
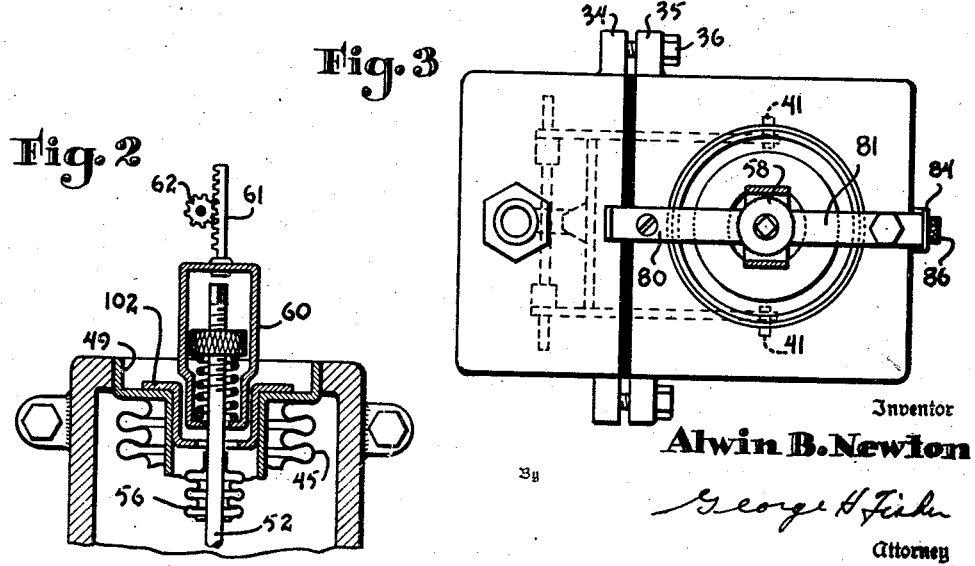
Figure 2 is a section taken along the line 2—2 of Figure 1.
Figure 3 is a view along the line 3—3 of Figure 1.

Referring more particularly to Figures 1 to 3, a conventional form of refrigeration system is illustrated, this system including a compressor 10 for compressing a refrigerant and forcing it through pipe 11 to a condenser 12 where the refrigerant is condensed and flows to a receiver 13 from which it flows through a pipe 14 through expansion valve 15 where the refrigerant is expanded, the expanded refrigerant then flowing through pipe 16 to an evaporator 17 where the refrigerant absorbs heat from the surrounding atmosphere and evaporates and then flows through pipe 18 back to the compressor 10. The compressor 10 may be controlled in any conventional manner.

The expansion valve 15 includes a valve casing 20 and a chamber 21 housing the operating mechanism. Valve casing 20 includes an inlet 22 to which is suitably connected in any suitable manner the pipe 14, and an outlet 24 to which is suitably connected the pipe 16. Refrigerant flows through the inlet 22 through a passageway 23 into a chamber 25. A valve element 26 cooperating with a removable valve seat 27 controls the flow of refrigerant from the chamber 25 into a passageway 28 which leads to the outlet 24. The valve element 26 is carried by a lever 30 pivoted at 31 in a recess formed in the outer wall of the valve casing 20. A spring 32 bears against the downwardly extending arm 33 of the lever 30, this spring being seated in a suitable recess formed in the outer wall of the valve chamber 20. Valve casing 20 and the casing 21 may be connected together in any suitable manner and flanges 34 and 35 may be provided on the outer walls of the casings 20 and 21 and suitably secured together by bolts 36. Pins 37 may be provided for properly aligning the two casings together and a sealing gasket 38 of any suitable material may be interposed between the casings. Casing 20 may be open on that portion which is contiguous the casing 21, there being a suitable opening 39 formed in the wall of the casing 21 which separates the two chambers from one another. Lever 30 may be in the form of a yoke as illustrated in dotted lines in Figure 3 and includes arms 40 which extend through the opening 39 into the casing 21, these arms 40 being biased upwardly by means of spring 32 into engagement with pins 41. These pins 41 are carried and moved by the operating mechanism in casing 21 as will be clearly described later.

The casing 21 houses a pair of bellows 45 and 46 which are axially aligned and are connected together and separated from one another by a cup-shaped member 47. The bellows 45 may be secured between a member 49 and the upper wall of the casing 21, member 49 being secured to the upper wall of the casing 21 in any suitable manner. A cup-shaped member 48 is provided in the lower wall of the casing 21 and the bellows 46 may be secured between this member and the lower wall portion of the casing 21. The member 47 forms a wall which separates the bellows 45 and 46 into a pair of separated chambers and in the upper portion of the member 47 is suitably fitted a nipple 50 having a restricted opening therethrough and providing communication between the interior of the bellows 45 and the chamber formed between the outside of the bellows 45 and 46 and the casing 21. It will be noted that this chamber formed between the bellows and the casing 21 is in communication by means of the opening 39 in the interior wall of casing 21 with the valve chamber 25 so that the valve chamber 25 and the chamber surrounding the bellows 45 and 46 are at all times during the operation of the system filled with warm refrigerant entering valve chamber 25 through inlet 22.

Connected to the bottom portion of member 47 is a vertically extending rod 52 which extends through an opening in the bottom portion of member 49, a bellows 56 being suitably secured to this rod near the upper portion thereof and the lower portion of this bellows being suitably secured to the lower wall portion of member 49. To the upper portion of rod 52 is threadedly secured a nut 58 against the under side of which bears a compression spring 59. The lower portion of spring 59 bears against the lower portion of a yoke 60, as more clearly illustrated in Figure 2, the upper portion of this yoke being connected to a rack 61 with which engages a gear 62 connected to a motor 63 for a purpose to be later described. At any given time the yoke 60 will be held in a fixed position and the spring 59 bearing against the bottom of the yoke and the nut 58 biases the rod 52 and accordingly the member 47 connected thereto in an upwardly direction.

Secured to the cup-shaped member 48 in the bottom of casing 21 is a fitting 65 having an inlet 66 communicating with a passageway 67 which communicates with the interior of the bellows 46. A pipe 68 is suitably secured within the inlet 66 of fitting 65, the other end of this pipe being secured by a suitable fitting 69 to the outlet of the evaporator 17. This fitting 69 may include a nipple 70 threaded at one end into the outlet of the evaporator and a nut 71 threaded onto the other end of the nipple and securing the end of pipe 68 which may be flared between the nut and outer portion of the nipple. Extending through the pipe 68 and spaced from the walls thereof is a small tube 74 which is suitably secured to the fitting 65 and communicates with a passageway 75 extending upwardly through the fitting 65. To the outlet portion of passageway 75 is secured a small tube 76 which may be spirally arranged within the bellows 46 and of flexible material. The upper end of this tube extends through a wall of the wall member 47 separating the bellows 45 and 46 from one another. Pipe 74 extends through the nipple 70 and into the outlet of the evaporator 17, this pipe terminating in a nozzle 78, which nozzle is directed away from the evaporator 17.

The bellows 46 is in communication by means of the pipe 68 with the outlet of the evaporator 17 and is accordingly subject to variations in the pressure of the refrigerant at the outlet of the evaporator. The upper bellows 45 is in communication by means of nipple 50 with the chamber formed between the bellows 45 and 46 and the casing 21 so that the warm refrigerant surrounding these bellows is able to pass through the small passageway in the nipple 50 where it is expanded into the bellows 45. This bellows is also in communication by means of the tube 76, the tube 74 and nozzle 78 with the outlet of the evaporator so that the pressure existing within the bellows 45 may be considerably less than the presure of the refrigerant surrounding the bellows, this latter refrigerant being on the high pressure side of the refrigeration system. There will accordingly be a considerable pressure differential between the exterior and the interior of bellows 45. It is well known that a fluid passing through a small nozzle has a critical pressure. In other words, when the pressure differential through the nozzle has reached a certain value, the nozzle will pass a maximum amount of fluid which amount will not be increased by increasing the pressure drop. With common refrigerants the critical pressure value will be somewhere in the neighborhood of .97. In other words if the pressure on the low pressure side of the nozzle is less than 97% of the pressure on the high pressure side of the nozzle the same amount of refrigerant will pass therethrough as will pass if the pressure on the low pressure side of the nozzle is further decreased. Therefore the amount of refrigerant flowing through the nipple 50 will not vary during the operation of the system since the pressure within the bellows 45 will always be less than 97% of the pressure on the outside of the bellows so that there will be a constant flow from the chamber surrounding the bellows 45 and 46 of the refrigerant through the nipple 50 and into the interior of bellows 45.

The refrigerant, upon passing through the nipple 50 expands and becomes evaporated thus filling the chamber 45, tube 76, and tube 74 with evaporated refrigerant. It should be noted at this point that the bellows 45 is surrounded by warm liquid refrigerant from the condenser 13 so that the refrigerant within the bellows will remain in the evaporated condition. The refrigerant passes outwardly through pipe 74 to the nozzle 78. This nozzle is also of small size so that the refrigerant will leave the pipe 74 through this nozzle at a slow rate. Because of the flow characteristics of the nozzle 78, when the refrigerant is in liquid form, a greater weight of refrigerant will flow therethrough per unit time than when the refrigerant is in gaseous form so that the amount of refrigerant in bellows 45 will depend upon the state of the refrigerant at the nozzle 78, which in turn depends upon the temperature at the evaporator outlet. The refrigerant at the end of the pipe 74 and the nozzle 78 is subjected to the temperature of the refrigerant leaving the evaporator 17 and if this temperature is sufficiently low, the refrigerant in the nozzle 78 will be liquefied and in that case the refrigerant will leave the nozzle 78 faster than it enters the chamber 45 through the nipple 50. The pressure acting downwardly against the plate member 47 will depend upon the amount of evaporated refrigerant within the bellows 45 and since this in turn will depend upon the temperature at the evaporator outlet it will be seen that the pressure acting downwardly upon the plate 47 varies as the temperature at the evaporator outlet. Since the bellows 46 is subjected to the suction pressure at the evaporator outlet it will be seen that the plate 47 moves in accordance with actual pressure at the evaporator outlet and in accordance with the pressure corresponding to the temperature of the refrigerant leaving the evaporator, or in other words, in accordance with variations in superheat of the refrigerant in the evaporator outlet.

The movement of pins 41 downwardly causes the opening of valve 26, this downward movement of the pins occurring when the pressure acting downwardly on the plate 47, which pressure is the pressure corresponding to the temperature of the refrigerant is greater than the suction pressure at the evaporator outlet plus the pressure exerted by spring 59 or in other words, when the superheat at the outlet of the evaporator reaches a predetermined value. The opening of the valve 26 permits an increased flow of refrigerant through pipe 16 and evaporator 17 whereupon the pressure at the evaporator outlet increases and/or the temperature decreases and the valve is again permitted to move towards closed position.

The provision of bellows 56 which forms a sealing bellows between the rod 52 and the upper portion of bellows 45 reduces the effective area of the bellows 45 since the pressure within this of the bellows 45 exerts an upward force on the bellows 56 tending to move the rod 52 upwardly so that the effective area of bellows 45 is less than that of bellows 46 by an amount corresponding to the area of the bellows 56. By reason of this, when spring 59 is properly adjusted it is possible to maintain a constant superheat at the evaporator outlet so that a uniform portion of evaporator 17 will be available for cooling purposes regardless of the temperature and pressure existing at the outlet thereof. This would not be true were the effective area of the two bellows equal since the relation between pressure and temperature for known refrigerants is not a straight line relationship so that the pressure exerted by the bellows 45 which will be termed the power bellows does not vary directly with the temperature. In other words, as the temperature of the refrigerant increases the pressure corresponding to the temperature increases at a greater rate. For this reason, the amount of superheat in the return line where the effective areas of the bellows are equal, varies with varying temperatures therein, the lower the temperature the greater amount of superheat since the degree of superheat depends upon the difference in the temperature in the return line and the temperature corresponding to the pressure in the return line or evaporator outlet. This effect is effectively compensated for by making the effective area of the power bellows somewhat smaller than the effective area of the bellows which is subjected to the outlet pressure.

For a better understanding of why my arrangement operates to maintain a constant superheat which cannot be maintained by the conventional arrangement using bellows of like areas, attention is directed to Figure 11 of the drawings. This figure shows the pressure temperature curve of the refrigerant known as Freon or F-12. All known refrigerants have curves which have generally the same characteristics as the curve illustrated so the following explanation will serve to describe the functioning of applicant's arrangement with any of the non-refrigerants.

Assume first that the bellows have similar areas, as for example 1.5 sq. in. At 0° F. the pressure is 23.87 pounds per square inch so the closing pressure resulting from the pressure of the refrigerant at this temperature will be 23.87 times the area of the bellows which is 1.5 sq. in. or 35.8 pounds. If it is desired to maintain a 10° superheat at the evaporator outlet, the pressure corresponding to 10° F. is 29.35 pounds per square inch so that the opening force on the valve will be this pressure times the bellows area or 44.02 pounds. In order to balance the pressures at 10° superheat, the force of the spring tending to close the valve will be the difference between the closing force of 35.8 pounds and the opening force of 44.02 pounds, or in other words, a spring pressure of approximately 8.2 pounds. If now the pressure at the evaporator outlet rises to 35.75 pounds which corresponds to a temperature 20° F., the closing force on the valve will be this pressure times the bellows area or 53.62 pounds plus the force of the spring which is 8.2 pounds or a total closing force of 61.82 pounds. The opening force at this time should be the same so that the actual pressure of the refrigerant in pounds per square inch will be 61.82 divided by the bellows area or 41.21 pounds per square inch. This pressure corresponds to a temperature of approximately 28° F. so that the superheat being maintained by the valve has now dropped from 10° to approximately 8°. As the pressure at the evaporator outlet increases, the superheat being maintained by the valve will decrease so that at a pressure of 51.68 pounds per square inch corresponding to 40° F., the actual superheat will have dropped to approximately 6°. It will thus be understood that with bellows of like areas, due to the characteristics of the pressure temperature curve of the refrigerant being employed, the degree of superheat will vary as the pressure and temperature of the refrigerant leaving the evaporator varies.

Assume now that the large bellows has an area of 1.54 sq. in. and that the small sealing bellows has an area of .25 sq. in. The bellows which responds to temperature will have an effective area equal to the difference of the large and small bellows or an effective area of approximately 1.29 sq. in. At 0° F. the pressure is 23.87 pounds so that there will be a closing force exerted by the pressure responsive bellows of 23.87 times the bellows area which is 1.54 sq. in. or a total pressure of 36.76 pounds. Assuming that it is desired to maintain a 10° superheat, the pressure corresponding to 10° F. is 29.35 pounds and this multiplied by the effective area of the temperature responsive bellows gives an opening force of 37.86 pounds. In order to balance the pressures at this point, the spring pressure will be equal to the difference of these pressures or approximately 1.1 pounds. If the pressure of the refrigerant leaving the evaporator is now 35.75 pounds per square inch corresponding to 20° F., the closing force exerted by the refrigerant pressure will be 35.75 times the bellows area of 1.54 sq. in. or a total force of 55.05 pounds. Since the spring pressure is 1.1 pounds, the total closing force will be approximately 56.15 pounds. In order to open the valve therefore the temperature must rise until there is a total opening force exerted on the valve of 56.15 pounds which divided by the effective area of the temperature responsive bellows gives a pressure of 43.56 pounds per square inch which corresponds to approximately 30° F. so that approximately 10° superheat is still being maintained by the valve. If the pressure of the refrigerant leaving the evaporator drops to 19.2 pounds per square inch corresponding to a temperature of −10° F., the force exerted by the pressure responsive bellows will be 29.57 pounds which added to the spring pressure of 1.1 pounds gives a total closing force of 30.67 pounds. The opening force on the valve in pounds per square inch must therefore be 30.67 divided by the effective area of the temperature responsive bellows or 23.72 pounds per square inch which corresponds to approximately 0° F. It will accordingly be seen that if the bellows areas are properly chosen and the force exerted by the spring intended to close the valve is properly chosen, the characteristics of the temperature pressure curve of the particular refrigerant employed may be properly compensated for and the refrigerant maintained at a substantially constant degree of superheat for varying pressures and temperatures of the refrigerant leaving the evaporator.

The provision of the nipple 50 and the nozzle 78 eliminates the necessity of using the customary temperature bulb having a sealed fill while producing the same results as has heretofore been obtained with the sealed fill. It is also possible to make a single connection to the suction line for the power bellows and the pressure bellows even where the outlet line is of small size which might not be possible with the conventional construction utilizing the bulb with the sealed fill. By reason of this single connection it is assured that the bellows will accurately correspond to the superheat at a single point in the outlet of the evaporator and by having the nozzle located within the suction line it is possible to obtain quicker response of the valve to variations in superheat. Also, since no sealed operating fill is required, the expansion valve may be interchangeably used with refrigeration systems using different kinds of refrigerants without affecting the superheat maintained at the evaporator outlet by properly adjusting the valve.

To prevent hunting of the valve, I have provided a suitable friction damping means for preventing the operation of the valve in response to minute changes in superheat at the evaporator outlet. The nut 58 which is threaded to the rod 52 may have a knurled surface or other suitable surface and a friction plate 80 is fixedly secured to the upper wall of the casing 21, this plate bearing against one side of the nut 58. A second plate 81 of any suitable friction material is slidably supported on the top of the casing 21 diametrically opposite from the plate 80, this plate being slotted as at 82 and being slidably held in place by means of a bolt 83. A spring 84 is secured as at 85 to the side of casing 21 and bears against the end of the plate 81. The force exerted by this spring on the plate 81 may be varied by means of a bolt 86 threaded into the side of the casing 21. Thus a force resisting the movement of the nut 58 and therefore of the valve 26 is provided by the plate 81, this force being adjustable by means of the bolt 86 so that it will require more than just a minute change in the degree of superheat at the evaporator outlet to cause any movement of the valve 26, whereby the danger of the valve hunting in response to minute changes in superheat may be effectively prevented.

A thermostat 90 may be mounted in the space being cooled, this thermostat comprising a bimetallic element 91 and an arm 92 connected to the bimetallic element 91 and movable thereby in response to changes in temperature in the space being cooled. Arm 92 is arranged to sweep across a resistance 93 in response to temperature changes in the space being cooled, this resistance being connected at its ends by means of conductors 94 and 95 to terminals 96 and 97 of the motor 63. The bimetallic element 91 is connected by means of a conductor 98 to motor terminal 99. Power may be supplied to the motor by means of conductors 100 and 101 connected to a suitable source of power not shown. Motor 63 is of the proportioning type and may be constructed in the manner shown by the patent to D. G. Taylor No. 2,028,110 issued January 14, 1936. This motor is a reversible motor, the direction of rotation and the extent of rotation being dependent upon the position of arm 92 with respect to resistance 93 as is clearly set forth in that patent. As the temperature in the space being cooled rises the arm 92 moves to the right across the resistance 93 and causes rotation of motor 63 an amount proportional to the extent of movement of the arm 92 in a direction to cause a decrease in the tension of spring 59 so that the amount of superheat required to open the valve 26 is decreased. In other words, the pressure corresponding to the temperature of the refrigerant at the evaporator outlet which is required to overcome the force exerted by the suction pressure within the bellows 46 and the spring 59 is decreased due to the decrease in the force exerted by the spring 59, and by decreasing the amount of superheat at the evaporator outlet, a greater portion thereof is avail able for cooling purposes. Conversely if the temperature in the space should drop indicating the need for less cooling within the evaporator, arm 92 of thermostat 90 moves to the left over resistance 93, causing the motor to rotate in a direction to increase the force of the spring 59 so that a greater amount of superheat is required to open the valve and a smaller portion of the evaporator will be filled with liquid refrigerant and accordingly will be available for cooling purposes. The downward movement of the yoke member 60 may be limited by means of a stop 102 suitably secured to the member 49.

It will be noted that with the bellows 45 and 46 arranged in the manner illustrated, that both sides thereof are at all times exposed to refrigerant and at no time is any portion of the bellows exposed to the atmosphere so that the life of the bellows is materially increased and the main cause of rupture thereof is eliminated. The superheat that will be maintained at the evaporator outlet for any given temperature in the space being cooled may be varied by adjusting the position of nut 58 on the rod 52 so as to vary the tension of the spring 59 and accordingly vary the force required to open the valve for any given temperature.

Figure 4:
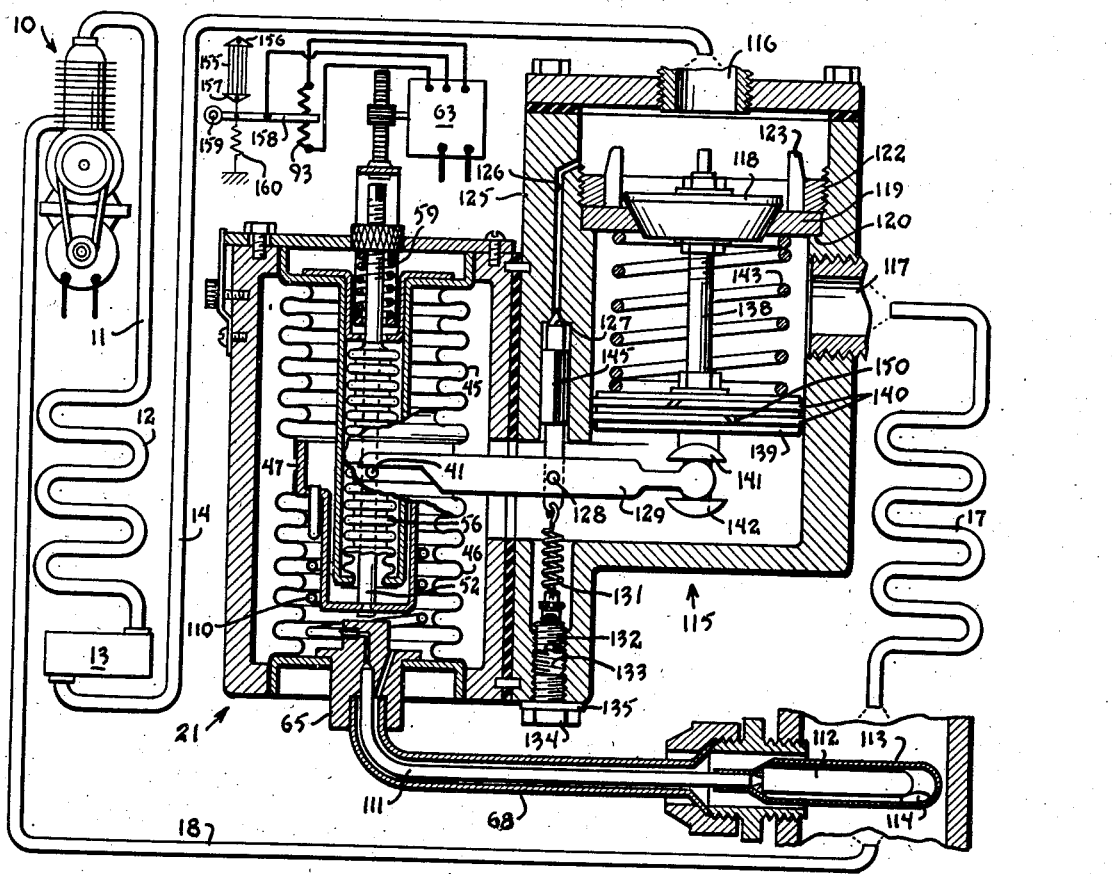
Figure 4 is a view illustrating in cross section a second form of expansion valve embodying my invention.

Referring now to the form of invention illustrated in Figure 4, a valve operating mechanism having a pair of bellows arranged in the manner shown in Figure 1 is provided for operating a pilot valve which in turn causes the operation of a large expansion valve such as may be used in large refrigeration installations such as air conditioning systems. In this figure a sealed fill is provided for supplying the pressure to the bellows 45 or the operating bellows. The nipple 50 in the plate member 47 is eliminated and the bellows 45 is connected by means of a capillary tube 110, the fitting 65 and the capillary tube 111 to an expansible bulb 112 which is located within a second bulb 113, this bulb 113 being sealed to the tube 111 in any suitable manner and containing a suitable volatile fill which may be of the same material as the refrigerant being used in the refrigeration system, the bulb 112 and the capillary tubes 110 and 111 containing a suitable hydraulic fill which has a low coefficient of expansion. Changes in temperature in the evaporator outlet will cause expansion or contraction of the volatile fill in the bulb 113 and these changes in expansion or contraction will be transmitted by means of the bulb 112 and the hydraulic fill to the power bellows 45. By using a hydraulic fill in the bulb 112, in the capillary tubes and bellows 45, this bellows will be unaffected by changes in temperature except those existing at the evaporator outlet. The lower bellows 46 is exposed to the outlet pressure in the same way as in Figure 1, and the spring 59 similar to that of Figure 1 is provided for opposing the downward movement of the rod 52 and consequently of the plate 47. It will thus be seen that the plate 47 is moved upwardly in response to an increase in suction pressure and is moved downwardly in response to an increase in temperature of the refrigerant at the evaporator outlet and by reason of the bellows 56 arranged as in Figure 1, for a proper setting of the spring 59 the bellows will cause operation of the valve so as to maintain a proper superheat in the evaporator outlet for varying temperatures and pressures existing at that point.

Suitably connected to the casing 21 housing the bellows is a valve casing indicated generally by the reference character 115. This casing includes an inlet 116 for the refrigerant passing from the receiver 13 and pipe 14, and a suitable outlet 117 from which expanded refrigerant flows to the evaporator 17. The flow of refrigerant from the inlet 116 to the outlet 117 is controlled by a valve 118 cooperating with a suitable valve seat 119, this valve seat resting on shoulders 120 formed in the vertical walls of the casing 115 and being held against these shoulders by means of a threaded guide member 122, this guide member carrying suitable valve guides 123 for guiding the valve 118 in its movement.

The wall 125 of the casing 115 which is positioned adjacent the casing 21 is provided with a passageway 126 which provides communication between the inlet 116 and the space surrounding the bellows 45 and 46, the flow of fluid through this passageway being controlled by means of a valve member 127 which is mounted for movement within an enlarged portion of the passageway 126, the shoulders between the large portion and small portion of the passageway forming a valve seat for the valve member 127. The lower portion of the valve member is pivotally connected at 128 to a lever 129, the left end of this lever resting upon the pin 41 and being held against the top of this pin by means of a spring 131 having one end fastened to the lower end of the valve member 127 and the other end connected by a swivel to an adjusting screw 132 held in the threaded opening 133 in the lower portion of the wall 125. A bolt 134 and washer 135 may be provided for sealing this opening 133 and preventing escape of refrigerant from the valve casing 115 around the screw 132.

The valve 118 has connected thereto in a suitable manner a valve stem 138 on the lower end of which is a piston 139 which may be provided with suitable piston rings 140, the interior of the valve casing 115 being formed as a cylinder within which the piston 139 may be caused to move back and forth. The lower end of the valve stem 138 below the piston 139 may terminate in a suitable socket formed of members 141 and 142 within which the right end of lever 129, which may be of cylinder form, is fitted. A spring 143 interposed between the lower portion of the valve seat 119 and the piston 139 biases the piston downwardly and the valve 118 against the valve seat 119.

It will be noted that the space surrounding the bellows 45 and 46 which communicates with inlet 116 by means of passageway 126 is also in communication with the portion of the valve casing 115 beneath the piston 139. When the superheat at the evaporator outlet reaches a high enough value so as to cause downward movement of pins 41 carried by plate 47, the lever 129 will pivot about the right end thereof, the spring 131 biasing the lever downwardly so as to cause the left end thereof to move with the pin 41. This movement of the lever causes the valve 127 to be moved away from its seat and permit the flow of refrigerant from the inlet 116 through the passageway 126 past the valve 127 and between the guide member 145 and the enlarged portion of the passageway into the space surrounding the bellows 45 and 46 in the lower portion of casing 115 and into the space below the piston 139. The guide member 145 for the valve 127 may have a cut away portion along its entire length to permit the passage of refrigerant thereby. The passage of refrigerant under the piston 139 causes the pressure to be built up thereunder and causes the piston to move upwardly within the valve casing against the force exerted by the spring 143, thus lifting the expansion valve 118 off its seat 119. This movement of the valve causes the lever 129 to pivot upwardly about the pin 41 thus causing the pilot valve 127 to move back towards its valve seat. Thus as the main valve 118 opens in response to the opening of the valve 127, the valve 127 is caused to move back towards its seat and the pilot valve follows up the action of the main valve and the main valve will finally come to rest in a position which corresponds to the superheat in the evaporator outlet. Refrigerant is permitted to leak past the piston 139 into the space below the valve 118 and into the outlet 117 by reason of the passageway 150 formed in the piston rings 140 so that as the superheat at the evaporator outlet decreases and the pilot valve moves back towards it seat the pressure which has been built up below the piston 139 will be gradually relieved and the valve 118 is thus able to move back towards its valve seat 119. These passageways 150 formed in the piston rings will have no appreciable effect while the valve 118 is open because as the pressure built up below the piston 109 begins to decrease, the downward movement of the piston will be attended by an opening movement of the pilot valve 127 which will permit the entrance of an increased amount of refrigerant below the piston 139 thus causing it to move back towards its proper position and the pilot valve again moves back towards its proper position. The valve will therefore remain substantially stationary until there is a change in superheat at the evaporator outlet.

Since the operating structure for the valve is an entirely separate member from the valve and valve casing it will be apparent that this operating structure may be used with either a pilot valve or may directly operate the expansion valve as in Figure 1. It will thus be seen that I have devised an improved operated mechanism which may be interchangeably used with an expansion valve direct actuated or an expansion valve actuated by a pilot valve.

The bellows 45, 46 and the sealing bellows 56 are so arranged that even in case of rupture of any one of these bellows no refrigerant will be lost thereby. For example, if the bellows 46 should rupture, the refrigerant leaving the evaporator outlet would be permitted to escape through the tube 68 into the chamber surrounding the bellows 45 but could not leak from the casing 21 unless the bellows 45 and the bellows 56 were both ruptured. Since the valve would become inoperative upon rupture of any one of the bellows, requiring manual attention, the rupture of this bellows would be discovered before any refrigerant had escaped by reason of the rupture of another bellows so that under normal conditions, even in the event of rupture of the bellows, no refrigerant would be lost.

A motor 63 may be connected as in Figure 1 to vary the tension of the spring 59 and this motor may be operated by a humidity controller 155. This humidity controller may be of any suitable construction such as hair elements connected between the fixed member 156 and a movable member 157 connected to a lever 158 pivoted at 159, this lever being arranged to sweep over the potentiometer resistance 93. A spring 160 is provided to bias the lever downwardly and upon a decrease in relative humidity in the space the lever will be moved upwardly about the pivot 159 against the action of spring 160 by reason of the contraction of the hairs. This decrease in relative humidity will indicate a need for a higher coil temperature and the motor will operate to decrease the tension of spring 59 so that the valve will require a lesser amount of superheat at the evaporator outlet in order to open, and the effective area of evaporator 17 will increase thus increasing the proportion of sensible cooling to the proportion of dehumidification. Conversely upon an increase in relative humidity, the arm 158 will move downwardly over resistance 93 by reason of the elongation of the hairs of the humidity controller and the motor will operate to increase the tension of spring 59 so that the valve 118 will open in response to a greater degree of superheat at the evaporator outlet and the effective cooling area of the evaporator 17 will decrease but the amount of dehumidification will increase in proportion to the amount of sensible cooling. While ordinarily in air conditioning systems it is desirable upon an increase in relative humidity to decrease the effective cooling area of the evaporator thus getting a lower coil temperature in order to remove a greater amount of moisture from the air in proportion to the amount of sensible cooling which is effected thereby, some systems are so arranged that the effective cooling area of the evaporator may be increased when a greater amount of dehumidification is desired and it will be apparent that motor 63 may, if desired, be operated to decrease the tension of the spring 69 upon an increase in relative humidity so that a lesser degree of superheat at the evaporator outlet and a greater effective cooling area thereof will be maintained. It will of course be understood that the humidity element 155 may be replaced by a temperature responsive element as in Figure 1 and likewise the temperature responsive element of Figure 1 may be replaced by the humidity responsive element of this figure. Furthermore if desired the motor could be controlled both by the temperature and humidity responsive elements so that the motor would operate to maintain a constant effective temperature within the space being cooled, the motor being controlled by the humidity and temperature responsive elements in a manner well known in the art.

Figure 5:
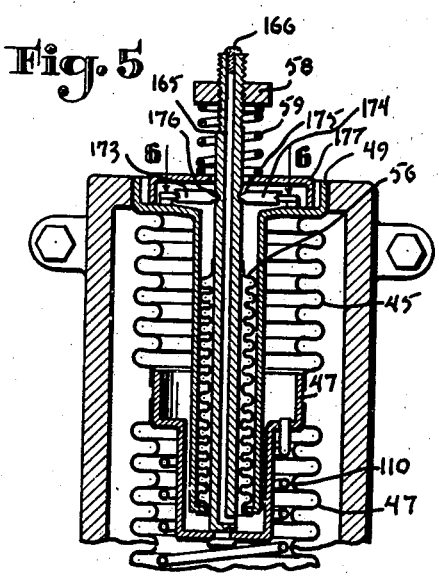
Figure 5 is a partial cross section of a modification of the operating mechanism for my expansion valve.
Figure 6:
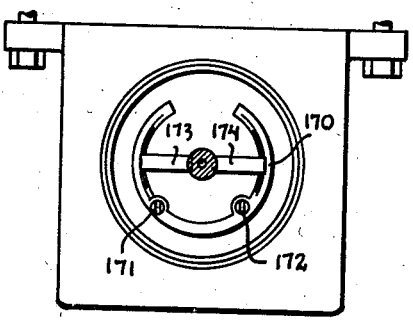
Figure 6 is a view taken along the line 6—6 of Figure 5 with the cover 177 removed.

Referring now to Figure 5 a bellows arrangement generally similar to that of Figure 4 is illustrated. The rod 52 is replaced by a tubular member 165 which has a passageway throughout its length, the passageway terminating above the plate member 47. This passageway forms a convenient means whereby the upper bellows 45 may be filled with a volatile fluid, the fill being inserted through the upper end of the tubular member 165 and the tubular member then being sealed at its upper end by any suitable sealing means 166. This method of filling the power bellows 45 is intended to be used particularly where the bellows, capillary tube 110, and the bulb which responds to the temperature at the evaporator outlet is all filled with a volatile fill as in the conventional arrangement. It will be understood of course that the bulb 112 containing a hydraulic fill, as in Figure 4, may if desired be eliminated and the bulb 113 of this figure communicate with the capillary tube 11, the bulb, tube, and bellows 45 all enclosing a volatile fill in which case the method of filling the bulb, tube, and bellows illustrated in Figure 5 could be employed.

The sealing bellows 56, as well as the bellows 45 and 47 and the tube 110 will have a spring rate that may be compensated for as shown in Figure 5. This compensating means may include a circular spring 170 suitably secured as at 171 and 172 to the upper portion of the member 49, this spring having a single turn with the ends thereof spaced apart as illustrated. Suitable toggle links 173 and 174 are notched at their outer ends and fit over the reduced inner portion of spring 170, the inner ends of these links being reduced and fitting within notches 175 and 176 formed in the upper portion of member 165. Upon a downward opening movement of the plate member 47, the bellows 56 and 47, and tube 110 tend to become compressed and this compression of the bellows and tube will tend to oppose the downward movement of the plate 47. Similarly, the expansion of bellows 45 tends to oppose the downward movement of plate 47. However, as member 165 moves downwardly, the inner portions of toggle links 173 and 174 will also be moved downwardly and by reason of the force exerted by spring 170 these links will exert a downward force on the rod 165 which force increases as the plate 47 moves downwardly and the bellows 56 becomes more compressed. This action of the toggle links intending to urge the member 165 downwardly may be arranged to just compensate for the spring rate of the various parts so that these parts will have no effect whatever on the movement of the plate 47 and therefore will not tend to oppose the opening of the expansion valve.

It will of course be apparent that the spring rate of the various parts may be compensated for in the same manner in the structures illustrated in Figures 1 and 2 as well as the figures to be hereinafter described. The spring 59 for opposing the action of the power bellows 45 may be provided between the nut 58 and an inverted cup-shaped member 177 which encloses the toggle links and spring, the rim of this cup-shaped member 177 resting on the top or upper portion of the member 49.

Referring now to the form of invention as shown in Figure 7, a modification of the pilot valve illustrated in Figure 4 is shown. The operating bellows assembly in this figure is similar to that shown in Figures 1 and 4 except that the compression spring 59 is replaced by a tension spring 180. This spring connects the lower end of the rod 52 and the bottom portion of the plate member 47. The nut 58 at the upper end of the rod 52 rests against shoulders 181 formed at the upper end of the casing 21. The spring 180 tends to move the plate member 47 upwardly towards the lower end of rod 52, the downward movement of this rod being limited by the nut 58. The action of the spring 180 may be suitably adjusted by adjusting the nut 58 with respect to the rod 52.

The valve housing 181 includes an inlet 182 and an outlet 183. A valve 184 resting upon a seat 185 controls the flow of refrigerant from the inlet 182 to the outlet 183. Valve seat 185 may be threadedly received within the casing 181 and may rest upon shoulders 186. The valve 184 includes a hollow valve stem 188 terminating in a piston 189 loosely fitted within the lower portion of casing 181. A pilot valve 190 which terminates in a suitable guiding means 191 controls the flow of refrigerant through the valve 184 to the underside of the piston 189. Valve 184 is biased against its seat by means of a spring 193 bearing against the underside of the valve seat 185 and the upper side of the piston 189.

The upper bellows may be connected by means of a tube connecting a hydraulic fill to a bulb similar to the bulb 113 of Figure 4 if desired. However the tube, bulb, and upper bellows may contain a suitable volatile fill which may be the same as the refrigerant used in the system. It will be noted that the bellows are both surrounded by the refrigerant entering the valve chamber through 182, this refrigerant coming from the condenser and being comparatively warm so that the bellows being surrounded by warm refrigerant will be substantially unaffected by variations in temperature of the air surrounding the casing 21 and the bellows will respond accurately to the temperature of the refrigerant leaving the evaporator.

Pilot valve 190 includes a valve stem 195 terminating in a bifurcated portion 196 between the furcations of which is received the rounded end portion 197 of a lever 198 pivoted at 199 to a portion of the valve casing 181. The opposite end of the lever 198 terminates in a portion resting against the underside of the pin 41 which moves with the plate member 47 as in Figures 1 and 4. A spring 200 positioned between a recess formed in the upper wall of the valve casing 181 and the upper side of a portion of the lever to the right of pivot 199 biases the pilot valve 190 to its closed position and also biases the left end of the lever against the pin 41. If desired means may be provided for adjusting the pivot point of the lever 198 so that the amount of movement of the valve 190 for a corresponding movement of the pin 41 may be effectively varied. This may be desirable where the operating mechanism is to be used for valves of various sizes.

The operating mechanism within the casing 21 may operate in the manner shown in Figure 4 so that the pin 41 moves downwardly when the superheat in the evaporator outlet reaches a predetermined value. As the pin 41 moves downwardly with the plate 47, lever 198 is caused to pivot counter-clockwise about the pivot 199 thus lifting the valve 190 from its seat in the center of the main valve 184. Refrigerant flowing into the upper portion of the valve casing 181 through the inlet 182 is now permitted to flow through the central passageway in the valve 184 and the valve stem 188 to the underside of the piston 189 where a pressure is exerted thereon tending to lift the piston and the valve 184 upwardly, thus permitting flow of refrigerant past the valve 184 to the outlet 183. As in Figure 4 the piston 189 is of greater area than the top of the valve 184 so that a greater total pressure is exerted by the refrigerant on the bottom of the piston than is exerted against the top of the valve so that an opening force is exerted on the valve. Upward movement of valve 184 causes the valve to follow the pilot valve 190 whereupon the pilot valve tends to be closed and the pressure below the piston 189 stops building up. This follow-up action will of course continue until a state of equilibrium is established and the main valve is opened an amount according to the superheat existing at the evaporator outlet. When the superheat at the evaporator outlet has dropped enough to permit pilot valve 190 to close and to cut off the supply of refrigerant to the underside of the piston 189 the pressure at the other side of the piston will be relieved since the piston fits loosely within the valve casing and the refrigerant thereunder will be forced out into the discharge outlet 183 by the action of the spring 193 in moving the piston downwardly whereupon the valve 184 will move to its closed position.

In the form of invention shown in Figure 8 another form of pilot valve is illustrated, the arrangement of the operating bellows being similar to that shown in the preceding figures with the exception of certain changes which are described below.

It will be noted in the preceding figures that the sealing bellows terminates below the spring 59 and the yoke 60. In the structure shown in this figure, the member 49 terminates above the top portion of the plate member 47 and the bottom portion of this member forms a stop for the yoke 60. The sealing bellows is accordingly made of small size and the bottom portion of the yoke 60 and the spring 59 surround this bellows.

The fitting at the bottom of the casing 21 is formed with passageways 210 and 211 which may be radially arranged and axially spaced from one another. The passageway 210 terminates in a recess 212 which is in communication with the pipe connected to the outlet of the evaporator. The passageway 211 communicates with the interior of the bellows 46 and a recessed portion in the outer wall of the casing 21 provides communication between the passageways 210 and 211 and therefore between the evaporator outlet and the interior of the bellows 46 when the fitting 205 is in the position illustrated. A second passageway 214 which provides communication between the outlet of the valve member and a port 215 in the inner wall of the casing 21 provides communication between the valve outlet and the passageway 211 and therefore the interior of the bellows 46 when the fitting 205 is rotated through 180°. With this arrangement the bellows 46 may respond either to the suction pressure at the evaporator outlet or to the pressure at the discharge side of the expansion valve as may be desired.

The valve casing 220 includes an inlet 221 and an outlet 222, inlet 221 being formed in the removable top wall of the casing 220. A valve 224 cooperates with a valve seat 225 to control the flow of refrigerant from the inlet 221 to the outlet 222 which leads to the evaporator. Valve 224 includes a valve stem 226 which may be guided in a recess 227 in the top wall of the housing 220, a passageway 228 providing communication between the recess 227 and that portion of the valve casing above the valve 224 so that a pressure will not be built up within the recess 227 when the valve is moved to open position. The valve stem 226 extends below the valve 224 and a piston 230 is suitably connected thereto at the lower portion thereof and is loosely fitted within a cylindrical portion formed within the lower portion of the valve casing. A spring 240 interposed between the underside of the valve seat 225 and the top of the piston 230 biases the valve 224 to closed position. Communication between the valve inlet 221 and the underside of the piston 230 is controlled by a pilot valve 235 cooperating with a seat 236, this valve and valve seat controlling the flow of refrigerant through a passageway 237. Valve 235 may include a suitable guiding means 238 suitably configurated so as to permit the passage of refrigerant thereby when the valve 235 is lifted off its seat.

Pivotally supported within the inner wall of valve casing 220 by means of a pivot 245 is a lever 246 terminating in a flanged portion 247. A spring 248 resting on the upper side of the valve 224 bears against the underside of the flange 247 and thus urges the lever 246 upwardly about the pivot 245 into engagement with a stop 270 carried by valve stem 226. To the opposite end of the lever 246 is pivoted at 250 a lever 251, the right end of which bears against the underside of the pin 41. The opposite end of this lever terminates in an upwardly extending flanged portion 255, this portion having an aperture in the center thereof through which the upwardly extending valve stem 260 of the pilot valve 235 extends. Adjacent the upper end of the stem 260 is a pin 262 with which cooperates the flanged portion 255 of the lever 251 to raise the valve 235 in accordance with upward movement of the left end of the lever 251. A spring 265 rests upon a flange or washer 261 positioned above the pin 262 to bias the valve towards closed position and the lever 251 in a counter-clockwise direction about the pivot point 250 so that the right end of the lever remains in engagement with the pin 241.

Upon an increase in the superheat at the evaporator outlet tending to move the pin 41 downwardly, the lever 251 will rotate about the pivot 250 so as to compress the spring 262 and cause an opening movement of the pilot valve 235. Refrigerant will now be permitted to flow from the valve inlet 221 past the pilot valve to the underside of the piston 230 thus forcing the piston and the valve 224 upwardly to permit the passage of refrigerant past the main valve 224. The piston 230 is made larger than the valve 224 so that the force exerted by the refrigerant against the piston 230 will be greater than that exerted against the top of the valve 224. As the valve is moved upwardly, the left end of lever 246 moves upwardly therewith under the influence of spring 248, this lever pivoting about pivot 245 and lowering the pivot 250 about which lever 251 is pivoted. The left end of lever 251 thus moves downwardly and relieves the tension of spring 262 whereupon the pilot valve 235 tends to move towards closed position and follow up the opening movement of the main valve 224. In this way a state of equilibrium between the valves 224 and 235 will be attained as in Figures 4 and 7.

The tension of spring 59 may be varied in accordance with the room temperature by a direct acting temperature responsive device in place of the motors illustrated in Figures 1 and 4. This means may comprise a bellows 280 filled with a suitable volatile fluid, this bellows acting against a lever 281 pivoted at 282 and connected by a pivot 283 to the upper end of the yoke 60. The lever 281 is held by means of a spring 284 against a pin 285 projecting from the movable portion of the bellows 280. As the temperature within the space being cooled rises the volatile fluid within the bellows 280 causes an expansion of the bellows and causes the left end of the lever 281 to move downwardly to decrease the tension of the spring 59 so that the valve will operate in response to a lower degree of superheat at the evaporator outlet whereby a greater portion of the evaporator is effective for cooling. Conversely as the temperature within the space being cooled decreases, the tension of the spring is increased so that the superheat required to open the valve is increased and the effective cooling area of the evaporator is lessened.

It will of course be recognized that the temperature responsive means for adjusting the spring 59 of this figure may be replaced by a direct acting humidity responsive device or by the temperature or humidity responsive control means illustrated in Figures 1 and 4 and similarly this direct acting temperature responsive controller may replace the temperature and humidity responsive controllers of Figures 1 and 4.

Figure 9:
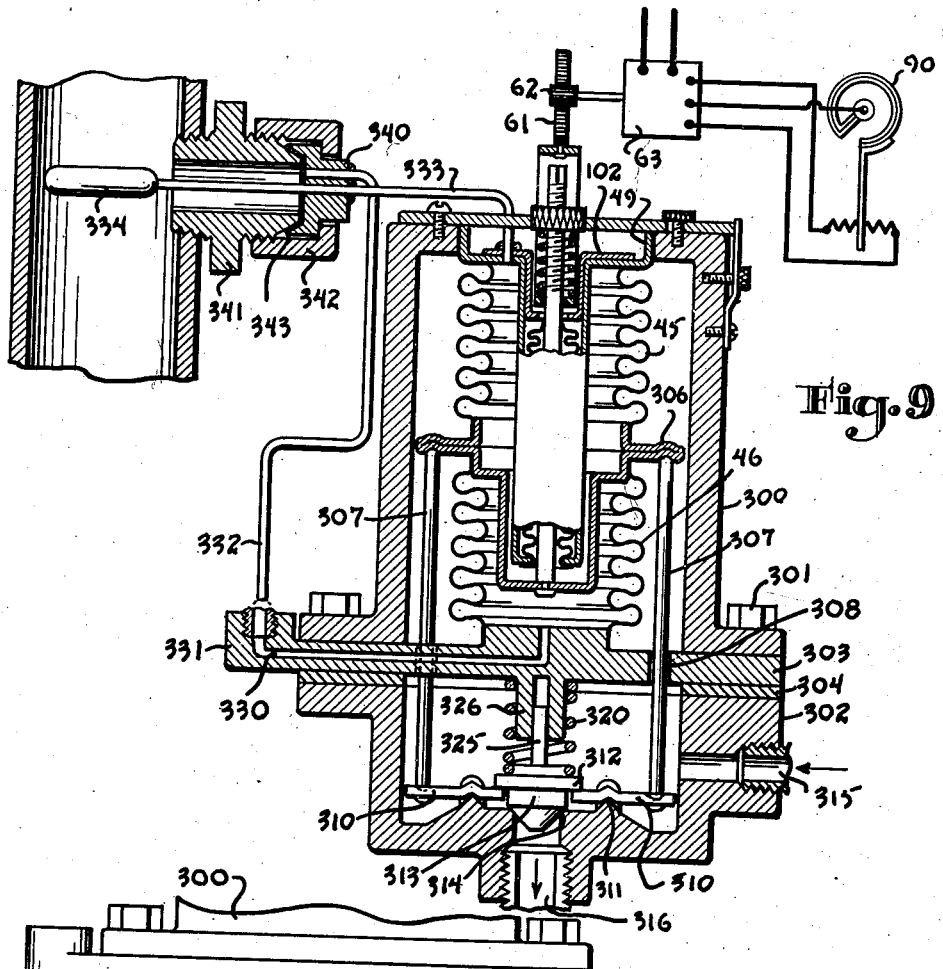
Figure 9 is a view in cross section of another form of my invention.

Referring now to the form of invention shown in Figure 9, the operating mechanism for the valve is mounted about the valve. The operating parts for the valve are housed in a casing 300 which may be suitably secured as by means of bolts 301 to the valve chamber 302. Interposed between the casings 300 and 302 is a plate member 303 for a purpose to be later set out and a suitable washer 304.

The operating parts in the casing 300 are similar to those previously described. In this case however the plate member connecting the bellows 45 and 46 may be suitably formed with an intergral flange 306 as illustrated in the drawing. Thrust rods 307 extend downwardly through openings 308 in the plate member 303, the lower ends of these thrust members bearing against the outer ends of levers 310 suitably pivoted at 311. The inner ends of these levers rest beneath a flanged portion 312 of the valve 313, this valve cooperating with a suitable valve seat 314 and controlling the flow of refrigerant from the inlet 315 to the outlet 316 as is apparent in the drawing. A spring 320 is positioned between the flange 312 of the valve 314 and the under portion of the plate 303, thus biasing the valve towards closed position and maintaining the thrust members 307 in engagement with the flange 306 of the plate member separating the two bellows. Valve 313 is provided with a valve stem 325 suitably guided in a downwardly extending boss 326 formed with the plate 303.

In the preceding forms of the invention the tubes connecting the upper and lower bellows with the evaporator outlet both entered the casing housing and the operating bellows through the bottom thereof, thus necessitating a tube within one of the bellows for providing communication between the upper bellows and the evaporator outlet. In this form of the invention the tubes for the two bellows are illustrated as being connected to the upper and lower portions of the casing 300, thus obviating the necessity of providing the tube such as the tube 76 of Figure 1. The plate 303 is provided with a suitable passageway 330 communicating with the bellows 46 and terminating in a portion 331 to which the tube 332 may be suitably connected. The tube 333 which is connected to the bulb 334 extends through the members 49 and 102 and may be soldered to the latter member to prevent leakage around the same. Both of these tubes may be soldered to a fitting 340 having a flared opening at the inner end thereof which may be held in fluid tight engagement with the tapered end of a fitting 341 by means of a nut 342. Suitable sealing means 343 may be provided between the members 340 and 341. By means of this fitting the two tubes, although not being arranged one inside the other may be readily fitted to any evaporator outlet at a single point thereof.

It will be noted that the openings 308 in the plate member 303 through which the rods 307 extend are considerably larger than the rods so that the warm refrigerant entering the inlet 315 will leak through these openings past the rods 307 so that the bellows 45 and 46 will be surrounded at all times by warm refrigerant. The bulb 334 may therefore be either of the type shown in Figure 4 or this bulb, the capillary tube 333, and the bellows 45 may all be filled with a volatile fluid which may be of the same systems as the refrigerant being used.

The remaining parts of this valve assembly are similar to those which have been previously described and further description thereof is deemed unnecessary. It will be apparent that as the superheat at the outlet of the evaporator varies, the flange 306 on the plate connecting the two bellows will move in response thereto and thus cause movement of the valve 313 through the rods 307 and the levers 310. The amount of superheat that is maintained at the evaporator outlet may be varied as in Figure 1 by the use of a thermostat 90, motor 63, rack 61, and gear 62 or by means of a humidity responsive device as shown in Figure 4 or the temperature responsive device illustrated in Figure 7.

Figure 10:
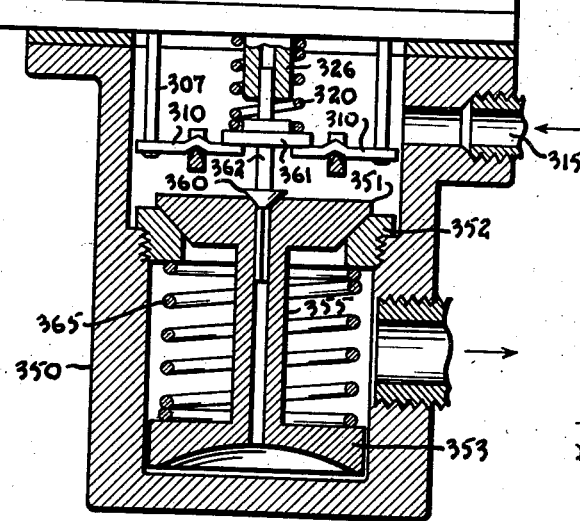
Figure 10 is a cross sectional view of still another form of my invention.

Referring now to Figure 10, the operating casing 300 is broken away but the parts not illustrated may be identical with that of Figure 9. The valve casing 350 may include a main valve 351 cooperating with a removable seat 352, a piston 353 being rigidly connected to the valve 351 by means of the hollow stem 355, this construction being similar to that which has been illustrated and described in connection with Figure 7. The levers 310 may operate a small valve 360 by acting against the flanged member 361 rigid with the valve stem 362. A spring 365 biases the valve 351 downwardly towards the seat 352.

In the operation of the valve of this figure, as the superheat existing at the evaporator outlet increases to a high enough value, the levers 310 are caused to pivot by means of the rods 307 so as to lift the valve 360 upwardly from the main valve 351, thus permitting warm refrigerant entering the valve inlet to pass downwardly through the hollow stem 355 to the underside of the piston 353 whereupon this refrigerant exerts a pressure upwardly to move the main valve 351 from its seat 352. The operation of this valve is substantially the same as the valve of Figure 7, the difference between these figures being in the arrangement of the operating mechanism for the small valve 360.

It should be understood that the various actuating mechanisms for the valves shown in the various views and the various arrangements of pilot and main valves are interchangeable, one of the features of this invention being the provision of a self contained actuating mechanism which may be applied to various types of expansion valves, either pilot operated or direct operated. It should also be understood that the means for compensating for the spring rate of the sealing bellows may be applied to the structures of any of these figures.

It will thus be apparent that I have devised an expansion valve operating mechanism utilizing bellows in which the bellows are so arranged that the possibility of rupture thereof is reduced to a minimum and in which the dangers resulting from a rupture of the bellows are also reduced to a minimum and that by the particular bellows arrangement, an operating structure that will control an expansion valve to maintain a constant degree of superheat at the outlet of the evaporator for varying degrees of temperature and pressure has been devised. Furthermore, by the use of the friction damping means, the objectionable feature of hunting of the expansion valve in response to minute variations in pressure or temperature at the evaporator outlet has been eliminated. It should also be understood that a sealing fill may be substituted for the nozzle 78, tube 74, nipple 50, etc. of Figure 1 if desired. The feature of enclosing the capillary tube connected to the volatile fluid bulb or the tube connecting the nozzle 78 with the bellows 46 by the tube connecting the evaporator outlet with the bellows 46 is believed to be an important improvement in the art since the two tubes may be very easily connected to the evaporator outlet at a single point and the power bellows will respond more accurately to the temperature of the refrigerant in the evaporator outlet by reason of the volatile fluid bulb or the nozzle 78 being surrounded by the refrigerant leaving the evaporator.

Having described the preferred forms of my invention, many modifications may become apparent to those skilled in the art and many combinations of the various features described will also become apparent and I wish it to be understood therefore that my invention is to be limited only by the scope of the appended claims.

I claim as my invention:

1. In a refrigerating system including a condenser, and an evaporator, an expansion valve located between the condenser and the evaporator for causing expansion of refrigerant flowing from the condenser into the evaporator, said valve including a valve casing, a valve seat and a valve element movable towards and away from said seat, and means responsive to variations in pressure and temperature for controlling the position of said valve element with respect to said seat, a tube connected to said valve and to the outlet of said evaporator and communicating the effect of pressure changes therein to the valve controlling means, and a second tube within the first tube and communicating the effect of temperature changes within said outlet to the valve controlling means, said second tube terminating within said outlet.

2. In a refrigerating system including a condenser, and an evaporator, an expansion valve located between the condenser and the evaporator for causing expansion of refrigerant flowing from the condenser into the evaporator, said valve including a valve casing, a valve seat and a valve element movable towards and away from said seat, and means responsive to variations in pressure and temperature for controlling the position of said valve element with respect to said seat, a tube connected to said valve and to the outlet of said evaporator and communicating the effect of pressure changes therein to the valve controlling means, and a second tube within the first tube and communicating the effect of temperature changes within said outlet to the valve controlling means, said second tube terminating in a bulb located within said outlet, said bulb containing a volatile fill, and said tube containing a fill for conveying the effect of temperature changes within said bulb to said valve controlling means.

3. In a refrigeration system, a pair of opposed extensible chambers, a wall member separating said chambers and rigidly connecting one end of one of said chambers to one end of the other of said chambers, a valve seat, a valve member cooperating with said valve seat to control the flow of refrigerant therethrough to the evaporator of a refrigeration system, means operatively connecting said valve member to the wall member between said chambers, means connecting one chamber to the low pressure side of the refrigeration system, means exposing the other chamber to a pressure which corresponds to the temperature of the refrigerant at the evaporator outlet, a bellows within said last named chamber and connected to said wall member, said bellows rendering the effective area of said wall member less than the total area thereof by such an amount as to insure the maintenance of a constant degree of superheat at the evaporator outlet for varying degrees of pressure and temperature at said outlet.

4. In a refrigeration system, a pair of opposed extensible chambers, a wall member separating said chambers and rigidly connecting one end of one of said chambers to one end of the other of said chambers, a valve seat, a valve member cooperating with said valve seat to control the flow of refrigerant therethrough to the evaporator of a refrigeration system, means operatively connecting said valve member to the wall member between said chambers, means connecting one chamber to the low pressure side of the refrigeration system, means exposing the other chamber to a pressure which corresponds to the temperature of the refrigerant at the evaporator outlet, biasing means for causing the expansion of one chamber and the contraction of the other chamber, and means cooperating with said wall member and said other chamber for reducing the effect of the pressure corresponding to the temperature of the refrigerant on said other chamber.

5. In a refrigeration system, a pair of opposed extensible chambers, a wall member separating said chambers and rigidly connecting one end of one of said chambers to one end of the other of said chambers, a valve seat, a valve member cooperating with said valve seat to control the flow of refrigerant therethrough to the evaporator of a refrigeration system, means operatively connecting said valve member to the wall member between said chambers, means connecting one chamber to the low pressure side of the refrigeration system, means exposing the other chamber to a pressure which corresponds to the temperature of the refrigerant at the evaporator outlet, biasing means for said movable wall, said biasing means including a connecting member extending through one of said chambers and connected to said wall member, adjusting means accessible exteriorly of said last named chamber for controlling the effect of said biasing means, a sealing bellows preventing escape of fluid from said last named chamber around said connecting member, said sealing bellows having a connection with said connecting member and being of such a size as to render the effective area of said wall member less than the total area thereof by such an amount that a constant degree of superheat is maintained at the evaporator outlet for varying degrees of pressure and temperature at said outlet.

6. In a refrigeration system, a pair of opposed extensible chambers, a wall member separating said chambers and rigidly connecting one end of one of said chambers to one end of the other of said chambers, a valve seat, a valve member cooperating with said valve seat to control the flow of refrigerant therethrough to the evaporator of a refrigeration system, means operatively connecting said valve member to the wall member between said chambers, means connecting one chamber to the low pressure side of the refrigeration system, means exposing the other chamber to a pressure which corresponds to the temperature of the refrigerant at the evaporator outlet, a sealing bellows within said last named chamber and connected to said wall member, said bellows rendering the effective area of said wall member less than the total area thereof by an amount such as to insure the maintenance of a constant degree of superheat at the evaporator outlet for varying degrees of pressure and temperature at said outlet, and damping means for preventing hunting of said valve member.

7. In a refrigeration system, a first bellows, a second bellows in axial alignment with said first bellows, wall means separating said bellows and movable therewith, a rod connected to said wall means and extending axially through the first of said bellows, spring means cooperating with said rod to urge said wall means in one direction, means exposing one side of said wall means to the pressure of the suction side of a refrigeration system, means exposing the other side of said wall means to a pressure corresponding to the temperature of the refrigerant in the outlet of the evaporator of the refrigeration system, a valve member, a valve seat, means connecting said valve member and said wall means whereby movement of said wall means causes the adjustment of said valve member with respect to said seat, and a sealing bellows connected to said rod and sealing said first bellows from the atmosphere.

8. In a refrigeration system, a first bellows, a second bellows in axial alignment with said first bellows, wall means separating said bellows and movable therewith, a rod connected to said wall means and extending axially through the first of said bellows, means exposing one side of said wall means to the pressure of the suction side of a refrigeration system, means exposing the other side of said wall means to a pressure corresponding to the temperature of the refrigerant in the outlet of the evaporator of the refrigeration system, a valve member, a valve seat, means connecting said valve member and said wall means whereby movement of said wall means causes the adjustment of said valve member with respect to said seat, a sealing bellows connected to said rod and sealing said first bellows from the atmosphere, and damping means cooperating with said rod to eliminate hunting of said valve.

9. In a refrigeration system including a condenser and an evaporator, a thermostatic expansion valve for controlling the flow of refrigerant from the condenser to the evaporator, said valve comprising, a first bellows, a second bellows in axial alignment with said first bellows, wall means separating said bellows and movable therewith, a rod connected to said wall means and extending axially through the first of said bellows, spring means cooperating with said rod to urge said wall means in one direction, means exposing one side of said wall means to the pressure of the suction side of a refrigeration system, means exposing the other side of said wall means to a pressure corresponding to the temperature of the refrigerant in the outlet of the evaporator of the refrigeration system, a valve member, a valve seat, means connecting said valve member and said wall means whereby movement of said valve member with respect to said seat, a sealing bellows connected to said rod and sealing said first bellows from the atmosphere, and means responsive to conditions in the space being cooled for varying the biasing effect of said spring means whereby the superheat at the evaporator outlet is controlled.

10. In a refrigeration system, a first bellows, a second bellows in axial alignment with said first bellows, wall means separating said bellows and movable therewith, a rod connected to said wall means and extending axially through the first of said bellows, spring means cooperating with said rod to urge said wall means in one direction, means exposing one side of said wall means to the pressure of the suction side of a refrigeration system, means exposing the other side of said wall means to a pressure corresponding to the temperature of the refrigerant in the outlet of the evaporator of the refrigeration system, a valve member, a valve seat, means connecting said valve member and said wall means whereby movement of said wall means causes the adjustment of said valve member with respect to said seat, a sealing bellows connected to said rod and sealing said first bellows from the atmosphere, said valve means being so arranged with respect to said first and second bellows that said bellows are at all times surrounded by liquid refrigerant.

11. In a refrigeration system, a casing, a first bellows sealed at one end to a wall of said casing, a plate member connected to the other end of said bellows, a second bellows connected at one end to said plate member and at the other end to an opposite wall of said casing, a rod connected to said plate member and extending through said opposite wall of said casing, a sealing bellows connected to said rod and sealing said other end of said second bellows, a valve member operatively connected to said plate member, means subjecting said first bellows to the pressure in the suction side of a refrigerating system, means subjecting said second bellows to a pressure corresponding to the temperature at the outlet of the evaporator of a refrigeration system, means biasing said plate member in a direction to cause contraction of said second named bellows and expansion of said first named bellows, and means carried by said rod for adjusting the effect of said biasing means.

12. In a refrigeration system, a casing, a first bellows sealed at one end to a wall of said casing, a plate member connected to the other end of said bellows, a second bellows connected at one end to said plate member and at the other end to an opposite wall of said casing, a rod connected to said plate member and extending through said opposite wall of said casing, a sealing bellows connected to said rod and sealing said other end of said second bellows, a valve member operatively connected to said plate member, means subjecting said first bellows to the pressure in the suction side of a refrigerating system, means subjecting said second bellows to a pressure corresponding to the temperature at the outlet of the evaporator of a refrigeration system, means biasing said plate member in a direction to cause contraction of said second named bellows and expansion of said first named bellows, and adjustable friction damping means bearing against said rod for reducing hunting of said valve.

13. In a refrigeration system, a refrigeration expansion valve comprising a pair of axially aligned bellows, an impervious cup-shaped member separating said bellows and connected thereto at its rim, a rod connected to the bottom of said cup-shaped member and extending through the top thereof, a sealing bellows connected to said rod and forming with said cup-shaped member and one of said bellows a closed chamber, means cooperating with said rod for biasing said cup-shaped member in one direction, means subjecting the interior of said cup-shaped member to a pressure which corresponds to the temperature of a refrigerant leaving the evaporator of a refrigeration system, means providing communication with the bellows surrounding the underside of the cup-shaped member and the suction side of a refrigeration system, a casing surrounding said bellows, said casing including a passageway for refrigerant which provides communication between the condenser and the evaporator of a refrigeration system, a valve for controlling the flow of refrigerant through said passageway, and valve actuating means connecting said valve and said cup-shaped member whereby movements of said cup-shaped member in response to changes in temperature and pressure on the suction side of a refrigeration system are communicated to said valve.

14. In a refrigeration system including a condenser and an evaporator, valve means for controlling the flow of refrigerant from the condenser to the evaporator, an operating mechanism responsive to the condition of the refrigerant in the suction side of the system, a valve member, a valve seat, means for connecting said valve member and said operating mechanism whereby the position of said valve member with respect to said seat is responsive to the condition of refrigerant existing in the suction side of the system, and means responsive to the position of said valve member with respect to said valve seat for controlling the position of said valve means.

15. In a refrigeration system including a condenser and an evaporator, a valve for controlling the flow of refrigerant from the condenser to the evaporator, a piston operatively connected to said valve, a device responsive to the superheat of the refrigerant at the outlet of the evaporator and movable in response to changes therein, means including a valve member and a valve seat for controlling the pressure applied to said piston and accordingly controlling the position of said valve, and means connecting said valve member and said superheat responsive device whereby the position of said valve member with respect to said valve seat is dependent upon the degree of superheat of the refrigerant at the evaporator outlet.

16. In a refrigeration system including a condenser and an evaporator, a valve for controlling the flow of refrigerant from the condenser to the evaporator, a valve chamber including a cylindrical portion, a piston operatively connected to said valve and guided within said cylindrical portion and being arranged to permit leakage of refrigerant thereby, a valve seat cooperating with said valve to control the flow of refrigerant into the cylindrical portion of said valve chamber, an inlet from the condenser to the portion of the valve chamber opposite the cylindrical portion, a passageway in the wall of the valve chamber providing communication between said inlet and the portion of the piston remote from said valve, valve means controlling the flow of refrigerant through said passageway, a device responsive to the superheat at the evaporator outlet in control of said valve means, and means connecting the inlet of the evaporator with the cylindrical portion of the valve chamber.

17. In a refrigeration system including a condenser and an evaporator, a valve for controlling the flow of refrigerant from the condenser to the evaporator, a valve chamber including a cylindrical portion, a piston operatively connected to said valve and guided within said cylindrical portion and being arranged to permit leakage of refrigerant thereby, a valve seat cooperating with said valve to control the flow of refrigerant into the cylindrical portion of said valve chamber, an inlet from the condenser to the portion of the valve chamber opposite the cylindrical portion, a passageway in the wall of the valve chamber providing communication between said inlet and the portion of the piston remote from said valve, valve means controlling the flow of refrigerant through said passageway, a device movable in response to variation in superheat at the evaporator outlet, a lever connected to said valve means and having a connection with said piston and said superheat responsive device, the arrangement being such that as the superheat responsive device moves, the lever pivots about its connection to said piston, and as the piston moves, the lever pivots about its connection with the superheat responsive device, whereby the position of the valve means is controlled both by the position of the piston and the superheat responsive device.

18. In a refrigeration system including a condenser and an evaporator, a valve for controlling the flow of refrigerant from the condenser to the evaporator, said valve including a valve chamber having a valve seat and a valve member cooperating with said valve seat, the portion of the valve chamber on the side of the valve member opposite the valve inlet being of cylindrical form, a piston in the cylindrical part of the valve chamber rigidly connected to the valve member, a passageway through said valve member, piston and connecting means providing communication between the valve inlet and the portion of the valve chamber on the side of the piston remote from said valve member, valve means in control of said passageway, means connecting the portion of the valve chamber between the piston and valve member with the inlet of the evaporator, and means responsive to the condition of the refrigerant in the suction side of the system for controlling the position of said valve means.

19. In a refrigeration system including a condenser and an evaporator, a valve for controlling the flow of refrigerant from the condenser to the evaporator, a piston rigidly connected to said valve whereby the position of said valve depends upon the pressure applied to said piston, valve means for controlling the pressure applied to said piston, operating mechanism for said valve means positioned directly above said valve and valve means, said mechanism comprising a pair of axially aligned expansible chambers having rigidly connected contiguous portions, one of said chambers being subjected to the suction pressure of the system, the other chamber being subjected to a pressure corresponding to the temperature of the refrigerant at the evaporator outlet, and means connecting said valve means to a movable portion of said expansible chamber assembly whereby the valve means and said piston cause movement of said valve in response to variations in superheat at the evaporator outlet.

20. In a refrigeration system including an evaporator and means for circulating refrigerant through the evaporator, the combination of, a valve for controlling the flow of refrigerant to the evaporator, means including a pressure responsive means for controlling the position of said valve, means forming passageways communicating with said evaporator and means movable to different positions associated with said passageways whereby said pressure responsive means may be subjected to the refrigerant pressure at the evaporator inlet or the evaporator outlet.

21. In a refrigeration system including a condenser and an evaporator, a valve for controlling the flow of refrigerant from the condenser to the evaporator, means controlling the position of said valve, said means including a means responsive to a pressure corresponding to the temperature of the refrigerant at the evaporator outlet and a pressure responsive means, means forming passageways communicating with said evaporator and means movable to different positions associated with said passageways whereby said pressure responsive means may be subjected to the refrigerant pressure at the evaporator inlet or the evaporator outlet.

22. In a control system for a refrigerating apparatus having an evaporator, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, a control valve in said passage for regulating the pressure of the refrigerant on said pressure responsive means to position the expansion valve, and means responsive to the superheat of the refrigerant at the evaporator outlet for regulating the control valve to maintain a desired amount of evaporating refrigerant in the evaporator.

23. In a control system for a refrigerating apparatus having an evaporator, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, a control valve in said passage for regulating the pressure of the refrigerant on said pressure responsive means to position the expansion valve, means responsive to the superheat of the refrigerant at the evaporator outlet for regulating the control valve to maintain a desired amount of evaporating refrigerant in the evaporator, said last mentioned means including means actuated in accordance with the pressure of the refrigerant in the evaporator and means actuated in accordance with the temperature of the refrigerant at the evaporator outlet.

24. In a control system for a refrigerating apparatus having an evaporator, the combination of, an expansion valve for regulating the supply of refrigerant to the evaporator, pressure responsive means for operating said valve, means including a passage for supplying refrigerant from the upstream side of the valve to the pressure responsive means and a passage for bleeding refrigerant from the pressure responsive means to the downstream side of the valve, a control valve in said first mentioned passage for regulating the pressure of the refrigerant on said pressure responsive means to position the expansion valve, and means for regulating the control valve to maintain a desired amount of evaporating refrigerant in the evaporator.

25. In a control system for a refrigerating apparatus having an evaporator, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, a control valve in said passage for regulating the pressure of the refrigerant on said pressure responsive means to position the expansion valve, means for regulating the control valve to maintain a desired amount of evaporating refrigerant in the evaporator, and means operated upon movement of the expansion valve for moving the control valve.

26. In a control system for a refrigerating apparatus having an evaporator, the combination of, an expansion valve for regulating the supply of refrigerant to the evaporator, pressure responsive means for operating said valve, means including a passage for supplying refrigerant from the upstream side of the valve to the pressure responsive means and a passage for bleeding refrigerant from the pressure responsive means to the downstream side of the valve, a control valve in said first mentioned passage for regulating the pressure of the refrigerant on said pressure responsive means to position the expansion valve, means for regulating the control valve to maintain a desired amount of evaporating refrigerant in the evaporator, and means operated upon movement of the expansion valve for moving the control valve.

27. In apparatus of the character described, in combination, a refrigeration system including a source of refrigerant supply and an evaporator, an expansion valve controlling the supply of refrigerant to the evaporator comprising means forming a pressure chamber having an expansible wall portion for urging the valve in one direction, means forming a second pressure chamber having an expansible wall portion for urging the valve in the opposite direction, means for communicating a pressure corresponding to the temperature at the outlet of the evaporator to one chamber, and means communicating evaporator pressure to the other chamber, the effective areas of said expansible wall portions being so related that the valve is positioned to maintain a constant degree of superheat at the outlet of the evaporator at various evaporator pressures.

ALWIN B. NEWTON.